May 31, 1949.                    W. A. MEYER                    2,471,969
                              BELT AND TRANSMISSION
                              Filed March 29, 1943
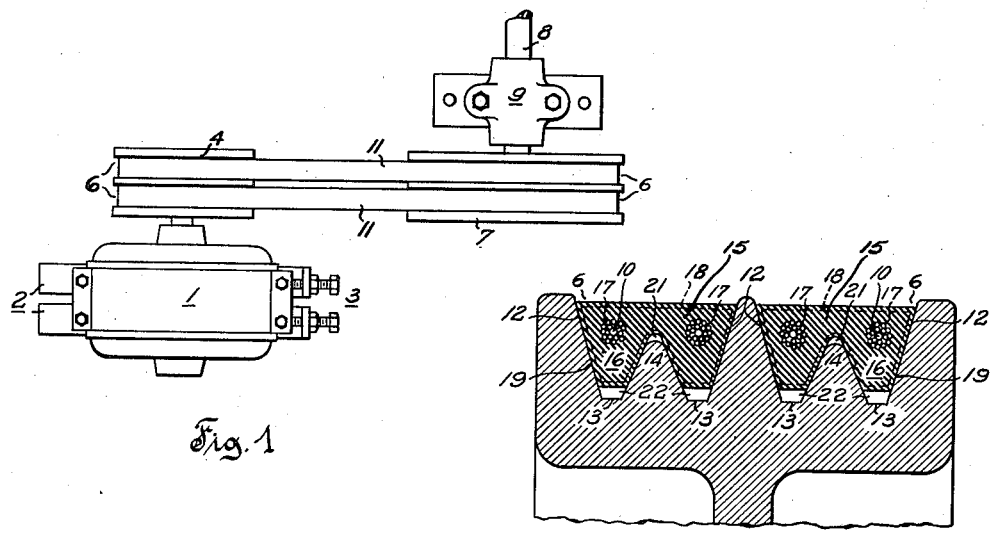
Fig. 1
Fig. 2
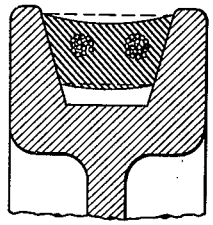
Fig. 3
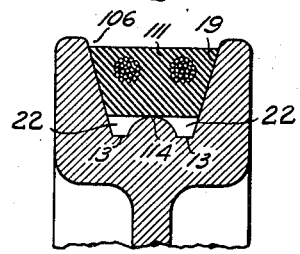
Fig. 4
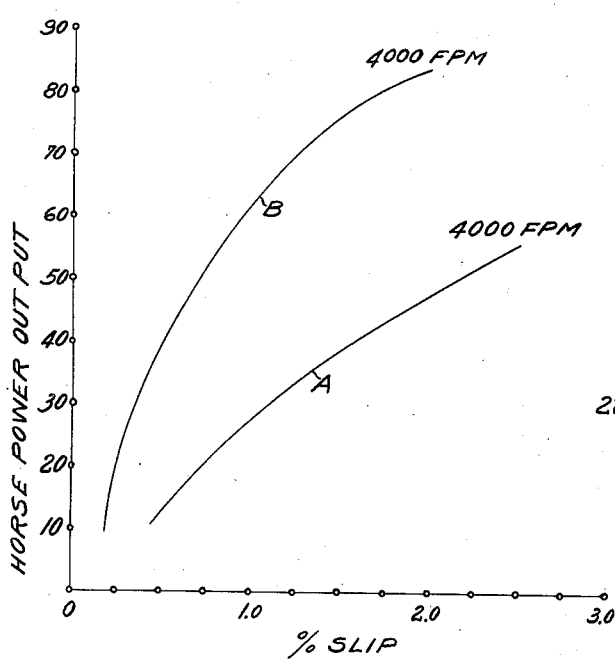
Fig. 5
Inventor
W. A. Meyer
by William L. Gates
Agent Patented May 31, 1949

2,471,969

UNITED STATES PATENT OFFICE 2,471,969

BELT AND TRANSMISSION

Walter A. Meyer, Wauwatosa, Wis., assignor to Allis-Chalmers Manufacturing Company, Milwaukee, Wis., a corporation of Delaware Application March 29, 1943, Serial No. 480,895

3 Claims. (Cl. 74—229)

This invention relates to improvements in V-type belt transmissions, transmission belts and sheaves.

An object of this invention is to provide a drive having improved grip between belts and sheaves, resulting in a reduced slip for a given power transmitted.

A further object is to provide a V-belt transmission in which buckling of the belt in the groove under tension is avoided.

A further object is to provide a V-type belt having lateral driving surfaces for engagement with the sheave and additional driving surfaces for engagement with the sheave intermediate the lateral surfaces.

A further object is to provide a V-type belt with a body of elastic material having relatively inextensible primary tension members localized in compact groups, with a belt supporting surface inwards of the space between a pair of such groups.

A further object is to provide a power transmission sheave having a groove of special conformation.

Another object is to provide a drive in which a substantial saving of the vital war material, rubber, is achieved.

Other objects may appear in the following description.

In the drawings:

Fig. 1 shows a plan view of an assembled multiple belt drive embodying the invention;

Fig. 2 shows an enlarged detail section taken radially through the rim of one of the sheaves of Fig. 1, with belts in driving engagement;

Fig. 3 snows an illustration of buckling of an ordinary conventional V-belt in a groove under stress;

Fig. 4 shows a fragmentary radial section through a sheave rim and belt of a modified embodiment of the invention; and Fig. 5 is a diagram showing curves illustrative of the results obtained by the invention.

The characteristics of V-belt drives and their advantages over flat belt drives are well known to the art. Such V-belts are, generally speaking, belts of trapezoidal cross-section formed of elastic material, reinforced at or near a neutral axis of flexion of the belt with strong, relatively inextensible, flexible cords or strands called primary tension members. Considering the belt as a beam, forces tending to bend the belt create stresses throughout the belt section, placing the inner parts in compression and the outer parts in tension. The neutral axis of flexion in such a beam of trapezoidal cross-section is theoretically in the median plane, at between one-half and two-thirds of the altitude of the belt section, and is the point of zero stress where the particles of the material are neither under compression nor tension. Where the belt is to be bent only in one plane there will be a line extending perpendicular to the median plane of the belt which will represent a transverse zone of the belt which will be neither under tension nor compression due to bending. That zone will be hereinafter referred to as the neutral zone of flexion. All the belt body inward of such zone will be under compression when the belt is flexed or bent around a sheave, and the portion outwards thereof will be under tension. The primary virtue of the V-belt resides in the fact that due to this compression of its inner zone, the belt tends to widen or deform towards rectangle form and press against the sides of the sheave groove, thus strongly gripping the sheave in driving relation while it is so bent. When the belt is straightened out upon leaving the sheave, the section resumes its normal trapezoidal form, the grip is relaxed and the belt leaves the sheave groove without sticking. The included angle of the groove sides and belt sides is carefully chosen at about 34–40 degrees (dependent largely on sheave diameter and the thickness of the belt) to obtain a maximum gripping force consonant with free entry and departure of the belt relative to the groove. The belt, for best results, must be free of contact with the groove bottom in order that it may take a varying position in the groove dependent on the stress or tension in the belt. However, when the tension on the belt is high, the unsupported part of the transverse section of the belt tends to be pulled radially inwards distorting the belt section and tending to pull the outer edges of the side surfaces of the belt away from the sides of the groove, reducing the effective gripping area. This is called buckling, and is illustrated in Fig. 3 of the drawing in an exaggerated manner, the dotted lines showing an ordinary conventional V-belt section, and the full lines showing the belt in buckled or strained condition.

It has previously been proposed to provide two or more V-belts of typical trapezoidal cross-section and join them by a connecting band outside the grooves of a multiple V-grooved sheave. The invention in this application is not concerned with a belt of this type, but rather with an improved individual V-type belt suited to use singly, or in multiple as in the drive of Geist Patent 1,662,511, in separate grooves each such groove being of special improved form.

Fig. 1 of the drawing shows in general a drive embodying the invention. In Fig. 1 a motor 1 is mounted on a base 2. A mechanism 3 is provided for moving the motor 1 on its base. The motor is provided with a driving sheave 4 having one or more annular peripheral grooves 6 of special form to be hereinafter described. In the illustrated form two grooves 6 are provided, but any number may be used. A driven sheave 7 is shown on a shaft 8 journaled for rotation in a bearing 9. Sheave 7 may or may not be provided with grooves 6. Power transmission belts 11 according to the invention are placed in engagement with separate grooves 6 of sheaves 4 and 7. Application of power to the motor 1 causes rotation of sheave 4, the belts 11 will transmit the motion of sheave 4 to sheave 7, causing rotation of shaft 8, which may be transmitted in any known manner to any mechanism requiring rotary motion.

The sheave grooves 6, as shown in Fig. 2, are generally trapezoidal, being formed with substantially frusto-conical side driving surfaces 12, and bottom surfaces 13. The said side driving surfaces of the grooves preferably have an inclined angle of approximately 34–40 degrees. An annular ridge 14 centrally of each groove projects radially outward from the groove bottom 13, with its apex radially within the peripheral limits of the groove. The ridges 14 shown in Fig. 2 are of substantially V-shaped cross-section, the cross-section of the groove being of approximately W-shape. These grooves may be referred to as W-shaped grooves. In this form of the invention the sheave groove has four lateral surfaces arranged like the four legs of the letter W, two main side driving surfaces 12 and the two side surfaces of the annular ridge 14. The included angle between the side surfaces of the ridge 14 is preferably substantially larger than that between the main side driving surfaces 12 to allow for the change in shape of the cross-section of the belt in flexing around the sheave. The belt 11 of the invention as shown in Fig. 2 is an endless band having a body 15 of elastic, resilient or rubber-like material, such as, for example, vulcanized rubber. Embedded in the rubber body are a pair of primary tension members 17, each of grommet-like formation, forming compact flexible groups of pulling cords or fibers each group having an axis or center of tensile effort 10. The belt structure is in general similar to the belt of Merrill et al., shown in U. S. Patent 2,233,294. A cover 18 similar to the cover of Merrill et al. may be applied to all surfaces of the belt. The belt 11 has a generally trapezoidal cross-section with inwardly converging sheave engaging side driving surfaces 19 extending the full depth of the belt. Midway of the side driving surfaces 19 a longitudinal continuous groove 21 having outwardly converging side surfaces is formed in the inner surface of the belt, said groove 21 having a depth substantially less than the side driving surfaces 19, and a basic width less than the base of the ridge 14 of the groove 6. The angle between the belt sides 19 is substantially equal to the angle between groove sides 12, and the width and depth of the belt 11 are chosen so that the belt will fit in a groove 6, as shown in Fig. 2, with its entire cross-section lying within the groove 6 and free of contact with the bottom surfaces 13 of the groove and the apical surface of ridge 14, leaving spaces 22 radially inward of the belt. The grooved belt obviously saves a considerable amount of material such as rubber over a solid trapezoidal belt of like dimensions.

It will be noted that the belt has a solid trapezoidal zone or body outwards of the groove 21 which has full lateral engagement with groove sides 12 and which includes the axes 10 of the primary tension members 17, and may be called the primary tension zone. The primary tension members 17 are so arranged that their axes 10 lie substantially in the neutral zone of flexion of the belt and substantially on the lines of maximum depth of the belt or the lines bisecting the interior angles between the side driving surfaces 19 of the belt and the side surfaces of belt groove 21.

In Fig. 4 a modified form of the invention is shown in which a belt similar to that of the patent to Merrill et al. above mentioned, or the common rubber-composition V-belt of commerce, is shown at 111 in combination with a novel groove form 106 in which the ridge 114 takes the form of a shallow ridge of any desired cross-section here shown as arcuate, with a depth just sufficient to contact the inner surface of belt 111 when said belt is in driving position in the groove 106. It will be noted that the inner surface of the belt adjacent the side surfaces 19 is free of contact with ridge 114 and bottom surfaces 13 of the groove 106, leaving spaces 22 radially inward of non-sheave contacting inner belt surface portions.

The invention results in an improved belt, an improved sheave and an improved belt transmission. It will be clearly apparent that the ridges 14 and 114 act to support the belt intermediate its span in the groove against forces tending to buckle the belt and reduce its gripping efficiency. The ridges 14 and 114 act as common reaction members for the primary tension members 17, dividing the groove spans of the belts 11 and 111 into two shorter spans. The radial force of the primary tension members tends to force the compressed portions of the belt into spaces 22 producing increased lateral pressure against groove sides 12 and in addition lateral pressure on the side surfaces of ridge 14, and both radial and lateral pressure on the surface of ridge 114 of Fig. 4.

In the form of Fig. 2, the bulging tendency of the inner zone of belt 11 due to flexing is exerted not only against sides 12, but also against the sides of ridge 14, while the pressure caused by wedging of the belt as a whole into the groove acts at the sides of the solid outer trapezoidal primary tension zone or body of the belt radially outwards of the groove 21. The belt may thus be considered as composed of a solid endless band of trapezoidal cross-section acting as a so-called V-belt between the sides of a trapezoidal groove, and two substantially V-shaped continuous longitudinal beads, such as indicated at 16, integrally joined to the inner surface of such band, each acting like a V-belt in the portions of the groove 6 between the sides 12 and the ridge 14. The belt has sufficient elasticity to permit automatic driving torque equalization between the several belts of a multiple belt drive.

The curves shown in Fig. 5 illustrate a comparison of certain characteristics of a standard V-belt drive with the same characteristics of a belt drive embodying the invention. Curve A shows a curve plotted with power output against percentage of slip, using standard single groove sheaves and a standard commercial V-belt with belt sped 4000 feet per minute and center belt tension 600 pounds. Curve B shows the results of a similar test, using a sheave of the same pitch diameter as the sheaves in the test resulting in curve A, grooved according to Fig. 2 of the drawing and a belt of the same general dimensions constructed according to Fig. 2 of the drawing. The same belt speed, 4000 feet per minute, and the same center tension, 600 pounds, are used in these tests. It is apparent from an inspection of the curves that the drive of the invention resulted in a greatly increased (in fact more than doubled) power capacity per belt for the same slip. If we enter the diagram at the ordinate representing 0.5% slip, we find the standard V-belt producing about 14 horsepower, according to curve A, while curve B shows the belt constructed according to the invention carrying 40 horsepower or almost three times as much for the same amount of slip. If we enter with the ordinate for 1% slip, we find the standard belt producing 28 horsepower as compared with 62 horsepower for the belt of the invention under the same conditions.

There is no groove in the normal inner belt surface in the drive of Fig. 4. In this embodiment, however, a limiting form of the invention is evident. The belt groove (21 in Fig. 2) has been reduced to zero in depth, and the ridge in the sheave groove has been correspondingly reduced as shown at 114 in Fig. 4. While there is radial contact between the sheave and the belt at the apex of ridge 114, there is a space 22 at each side of the belt to permit substantial wedging of inner side portions of the elastic belt body into the groove. Ridge 114 still divides the span of the belt and acts as a common reaction member to resist buckling of the belt in the groove. Primary tension members 17 act in this form, as in that of Fig. 2, to wedge the inner side portions of the elastic body radially into spaces 22. The belt 111 has sufficient elasticity to permit a substantial change in effective pitch diameter to obtain improved driving grip and to permit automatic equalization of driving torque between individual belts of a multiple belt drive, as in the hereinabove mentioned Geist Patent No. 1,662,511.

The concentration of the primary grommet-like pulling cords in well separated groups 17 in a relatively elastic body medium allows a limited amount of freedom of motion of the two groups relative to each other in order that slight differences in effective circumference to the two grommet-like groups of pulling cords, or in proportions of the belt section lateral to groove 21 may not cause a differential of stress between the cords. The belt, owing to this construction, will tend to take such a position in the groove as to equalize the tension in the pulling cords. This concentration of pulling cords in groups close to the driving surfaces 19 coupled with the provision of a driving surface or surfaces laterally intermediate the two groups and separated therefrom by fairly thin layers of elastic body material will increase greatly the area of body material which bears the shear stress or flexing moment caused by the transmission of the load from the driving surface to the embedded primary tension members. There will be a greatly reduced longitudinal shift of the relative positions of the primary tension members and driving surfaces as the belt enters and leaves the tensioned or driving reach, resulting in reduced slip and less internal heating.

While specific embodiments of the invention have been particularly described and illustrated, it will be understood that such modifications and equivalents as may readily occur to persons skilled in the art are intended to be included within the scope of this invention, which is limited only by the scope of the claims appended hereto.

It is claimed and desired to secure by Letters Patent:

1. The combination of rotatable driving and driven sheaves at least one of which has a substantially W-shaped annular groove and a power transmission belt having spaced continuous relatively inclined surfaces for cooperation with the four corresponding relatively inclined surfaces of said annular groove, said belt being of substantially less depth in cross section than said groove, said relatively inclined surfaces of said annular groove and said belt being so spaced that said belt engages said groove laterally throughout the full radial depth of said belt and is free of contact with the radially inmost extremities of said annular groove and the apex of the ridge in said substantially W-shaped annular groove.

2. A power transmission belt for a pulley having an annular groove of W-shaped cross-section providing an outwardly directed ridge at its inner side, comprising an endless band having spaced inwardly converging sides for full engagement with the outer sides of said annular groove, and spaced outwardly converging ridge engaging surfaces for lateral engagement with the ride of said groove, said band being formed of a resilient material having embedded therein a laterally spaced pair of flexible, relatively inextensible primary tension members extending longitudinally of said belt in parallel relation, each said tension member being disposed outwardly of said ridge-engaging surfaces and having its longitudinal axis substantially in a plane besecting the interior angle between a side surface and the adjacent ridge engaging surface.

3. A power transmission sheave having an annular groove in the peripheral surface thereof, said groove having spaced frusto-conical belt engaging sides with an included angle of 34–40 degrees, and a belt engaging ridge spaced from said belt engaging sides, said ridge having a substantially lower radial altitude than said belt engaging sides, the included angle between the side surfaces of said ridge being substantially greater than the said included angle between said spaced frusto-conical belt engaging sides.

WALTER A. MEYER.

REFERENCES CITED

The following references are of record in the file of this patent:

UNITED STATES PATENTS

| Number | Name | Date |
|---|---|---|
| 1,656,628 | Gits | Jan. 17, 1928 |
| 1,662,511 | Geist | Mar. 13, 1928 |
| 1,777,864 | Short | Oct. 7, 1930 |
| 1,805,442 | Wallfisch | May 12, 1931 |
| 2,029,381 | Merrill et al. | Feb. 4, 1936 |
| 2,060,322 | Johnson | Nov. 10, 1936 |
| 2,255,884 | Hedgpeth | Sept. 16, 1941 |

FOREIGN PATENTS

| Number | Country | Date |
|---|---|---|
| 19,103 | Netherlands | Dec. 15, 1928 |

Certificate of Correction

Patent No. 2,471,969.

May 31, 1949.

WALTER A. MEYER

It is hereby certified that errors appear in the printed specification of the above numbered patent requiring correction as follows:

Column 4, line 75, for "sped" read *speed*; column 6, line 33, claim 2, for the word "ride" read *ridge*; line 41, same claim, for "besecting" read *bisecting*;
and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*